(12) United States Patent
Suresh et al.

(10) Patent No.: US 10,326,596 B2
(45) Date of Patent: Jun. 18, 2019

(54) TECHNIQUES FOR SECURE AUTHENTICATION

(71) Applicant: INTEL CORPORATION, Santa Clara, CA (US)

(72) Inventors: Vikram Suresh, Hillsboro, OR (US); Sudhir Satpathy, Hillsboro, OR (US); Sanu Mathew, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 269 days.

(21) Appl. No.: 15/283,315

(22) Filed: Oct. 1, 2016

(65) Prior Publication Data

US 2018/0097630 A1 Apr. 5, 2018

(51) Int. Cl.
| | |
|---|---|
| H04L 9/00 | (2006.01) |
| H04L 9/32 | (2006.01) |
| H04L 9/06 | (2006.01) |
| G06F 7/72 | (2006.01) |
| G09C 1/00 | (2006.01) |
| H04L 9/28 | (2006.01) |

(52) U.S. Cl.
CPC ............ *H04L 9/3236* (2013.01); *G06F 7/724* (2013.01); *G09C 1/00* (2013.01); *H04L 9/0643* (2013.01); *H04L 2209/12* (2013.01); *H04L 2209/24* (2013.01)

(58) Field of Classification Search
CPC ..... G06F 7/724; G06F 17/16; H04L 2209/12; H04L 9/0643; H04L 9/3236; H04L 9/3247
USPC ........................................................ 380/28
See application file for complete search history.

(56) References Cited

U.S. PATENT DOCUMENTS

| | | | | |
|---|---|---|---|---|
| 5,818,939 | A * | 10/1998 | Davis ..................... | G06F 21/72 713/192 |
| 2003/0051026 | A1* | 3/2003 | Carter .................... | H04L 41/00 709/224 |
| 2005/0058285 | A1* | 3/2005 | Stein ..................... | H04L 9/0631 380/29 |
| 2005/0283714 | A1* | 12/2005 | Korkishko ............. | G06F 7/724 714/781 |
| 2008/0304664 | A1* | 12/2008 | Suthaharan ........... | H04L 9/0662 380/46 |
| 2009/0003589 | A1* | 1/2009 | Mathew ................ | H04L 9/0631 380/28 |

(Continued)

*Primary Examiner* — Gary S Gracia

(57) ABSTRACT

Various embodiments are generally directed to techniques for secure message authentication and digital signatures, such as with a cipher-based hash function, for instance. Some embodiments are particularly directed to a secure authentication system that implements various aspects of the cipher-based hash function in dedicated hardware or circuitry. In various embodiments, the secure authentication system may implement one or more elements of the Whirlpool hash function in dedicated hardware. For instance, the compute-intensive substitute byte and mix rows blocks of the block cipher in the Whirlpool hash function may be implemented in dedicated hardware or circuitry using a combination of Galois Field arithmetic and fused scale/reduce circuits. In some embodiments, the microarchitecture of the secure authentication system may be implemented with delayed add key to limit the memory requirement to three sequential registers.

19 Claims, 17 Drawing Sheets

(56) References Cited

U.S. PATENT DOCUMENTS

| | | | | |
|---|---|---|---|---|
| 2009/0077153 | A1* | 3/2009 | Dobbelaere | G06F 7/724 |
| | | | | 708/520 |
| 2010/0057823 | A1* | 3/2010 | Filseth | H04L 9/0631 |
| | | | | 708/492 |
| 2010/0306293 | A1* | 12/2010 | Li | G06F 7/724 |
| | | | | 708/209 |
| 2013/0007573 | A1* | 1/2013 | Radhakrishnan | G06F 11/1076 |
| | | | | 714/807 |
| 2013/0132737 | A1* | 5/2013 | Horsnell | G06F 9/30029 |
| | | | | 713/190 |
| 2014/0016774 | A1* | 1/2014 | Wolrich | G06F 9/30018 |
| | | | | 380/28 |
| 2015/0128011 | A1* | 5/2015 | Rochman | H03M 13/1545 |
| | | | | 714/773 |
| 2015/0341168 | A1* | 11/2015 | Gueron | H04L 9/0838 |
| | | | | 380/28 |
| 2015/0381205 | A1* | 12/2015 | Zhang | H03M 13/116 |
| | | | | 714/773 |
| 2016/0013931 | A1* | 1/2016 | Pisek | H04L 9/0631 |
| | | | | 380/28 |
| 2016/0087654 | A1* | 3/2016 | Anderson | H03M 13/1515 |
| | | | | 714/776 |
| 2016/0088302 | A1* | 3/2016 | Zheng | H04N 19/46 |
| | | | | 375/240.03 |
| 2016/0269175 | A1* | 9/2016 | Cammarota | G09C 1/00 |

* cited by examiner

```
Receive a message block, the message block comprising a input matrix of bytes.
1102
```
↓
```
Map, through fused scale/reduce logic, each byte in a row of the input matrix of bytes to a new
value, the new value based on each of the other bytes in the row.
1104
```
↓
```
Generate an output matrix of bytes based on the mapping.
1106
```

FIG. 12

*Storage Medium 1200*

*Computer Executable Instructions for 1000*

*Computer Executable Instructions for 1100*

*1400*

TECHNIQUES FOR SECURE AUTHENTICATION

BACKGROUND

Hash functions may be any function that can be used to map data of arbitrary size to data of fixed size. Typically, cryptographic hash functions are a class of one-way hash functions that have certain properties that make them suitable for use in cryptography. A cryptographic hash function may receive a message as input and provide a digest or signature of the message as output. The properties that make a desirable cryptographic hash function can include the ability to quickly compute a digest, the infeasibility of generating a message from its digest except by trying all possible messages, small changes to a message result in a new digest that appears uncorrelated with the old digest, and the infeasibility of finding two different messages with the same digest. Cryptographic hash functions can have many information-security applications, such as digital signatures, message authentication codes (MACs), among other forms of secure authentication.

BRIEF DESCRIPTION OF THE DRAWINGS

FIG. 11 illustrates an embodiment of a second logic flow.

FIG. 12 illustrates an embodiment of a storage medium.

DETAILED DESCRIPTION

Figure 1:
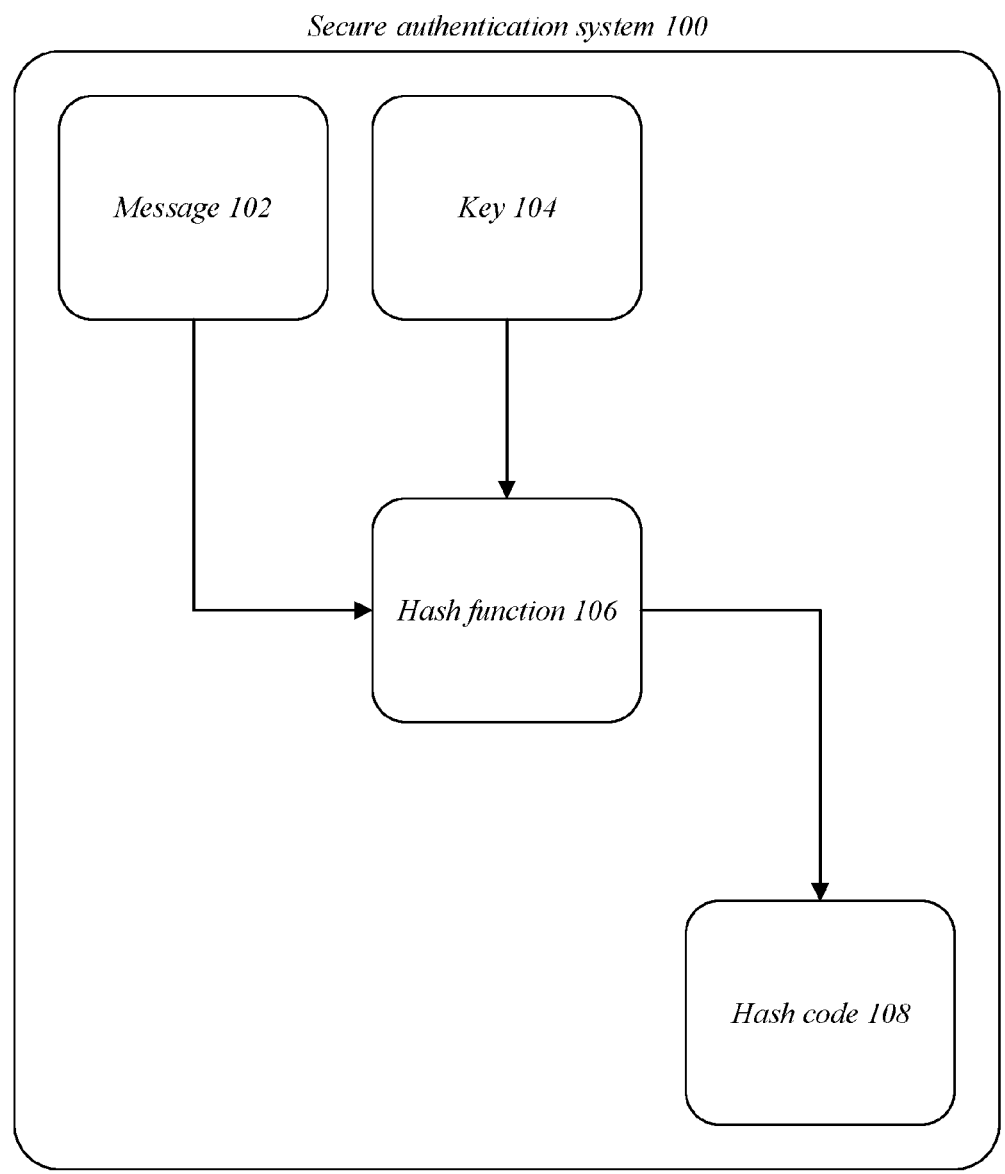
FIG. 1 illustrates an embodiment of a secure authentication system.

Various embodiments are generally directed to techniques for secure message authentication and digital signatures, such as with a cipher-based hash function, for instance. Some embodiments are particularly directed to a secure authentication system that implements various aspects of the cipher-based hash function in dedicated hardware or circuitry. In various embodiments, the secure authentication system may implement one or more elements of the Whirlpool hash function in dedicated hardware. For instance, the compute-intensive substitute byte and mix rows blocks of the block cipher in the Whirlpool hash function may be implemented in dedicated hardware or circuitry using a combination of Galois Field arithmetic and fused scale/reduce circuits. In some embodiments, the microarchitecture of the secure authentication system may be implemented with three sequential registers for add key computation.

Some challenges facing secure authentication systems include impractical, bulky, and inefficient techniques for computing a hash code for a message. Secure authentication systems using cipher-based hash functions can be implemented in software, which can result in large latencies in high performance systems and higher energy consumption in power constrained devices. Further, many software implementations require extensive use of lookup tables (LUT) to generate the hash code. Extensive use of LUTs to implement a cipher-based hash function results in significant area and energy penalties. These and other factors may result in a secure authentication system with poor performance and limited energy efficiency. Such limitations can drastically reduce the usability and applicability of the secure authentication system, contributing to inefficient systems with reduced capabilities.

Various embodiments described herein include a secure authentication system that utilizes hardware acceleration to optimize the area and the performance of a cipher-based hash function. In some embodiments, a hardware accelerator may support the Whirlpool hash function, such as by improving performance of the block cipher in the Whirlpool hash function. For instance, the substitute byte and mix rows blocks of the block cipher may be optimized using a combination of Galois Field arithmetic and fused scale/reduce circuits. In some instances, the microarchitecture of the secure authentication system may be optimized with delayed add key computation to reduce the sequential logic area and clock power. For example, the microarchitecture may be implemented with delayed add key to limit the memory requirement to three sequential registers. In these and other ways the secure authentication system may enable quick and efficient cipher-based hashing through hardware implementation to achieve improved secure authentication systems with increased throughput, reduced cell area, and higher operating frequencies, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of a secure authentication system 100. Secure authentication system 100 may include a message 102, a key 104, a hash function 106, and a hash code 108. In some embodiments, the hash function 106 may receive the message 102 and the key 104 as inputs and generate the hash code 108 as output. As will be described in more detail below, the secure authentication system 100 may include one or more dedicated hardware or circuitry components to improve overall performance and efficiency of hash function 106. In some embodiments, hash code 108 may be used for message authentication and may be referred to as a message digest, a finger print, or a digital signature. In various embodiments, hash function 106 may include a cipher-based hash function. In various such embodiments, hash function 106 may include the Whirlpool hash function (Whirlpool). In some embodiments, Whirlpool can be a one way, collision resistant cryptographic hash algorithm that is a part of the International Standards Organization's (ISO) ISO/IEC 10118-3:2004 hash standard. In various embodiments, Whirlpool may be a block-cipher-based hash function using Merkle-Damgard strengthening and the Miyaguchi-Preneel hashing scheme with a dedicated 512-bit block cipher. Embodiments are not limited in this context.

Figure 2:
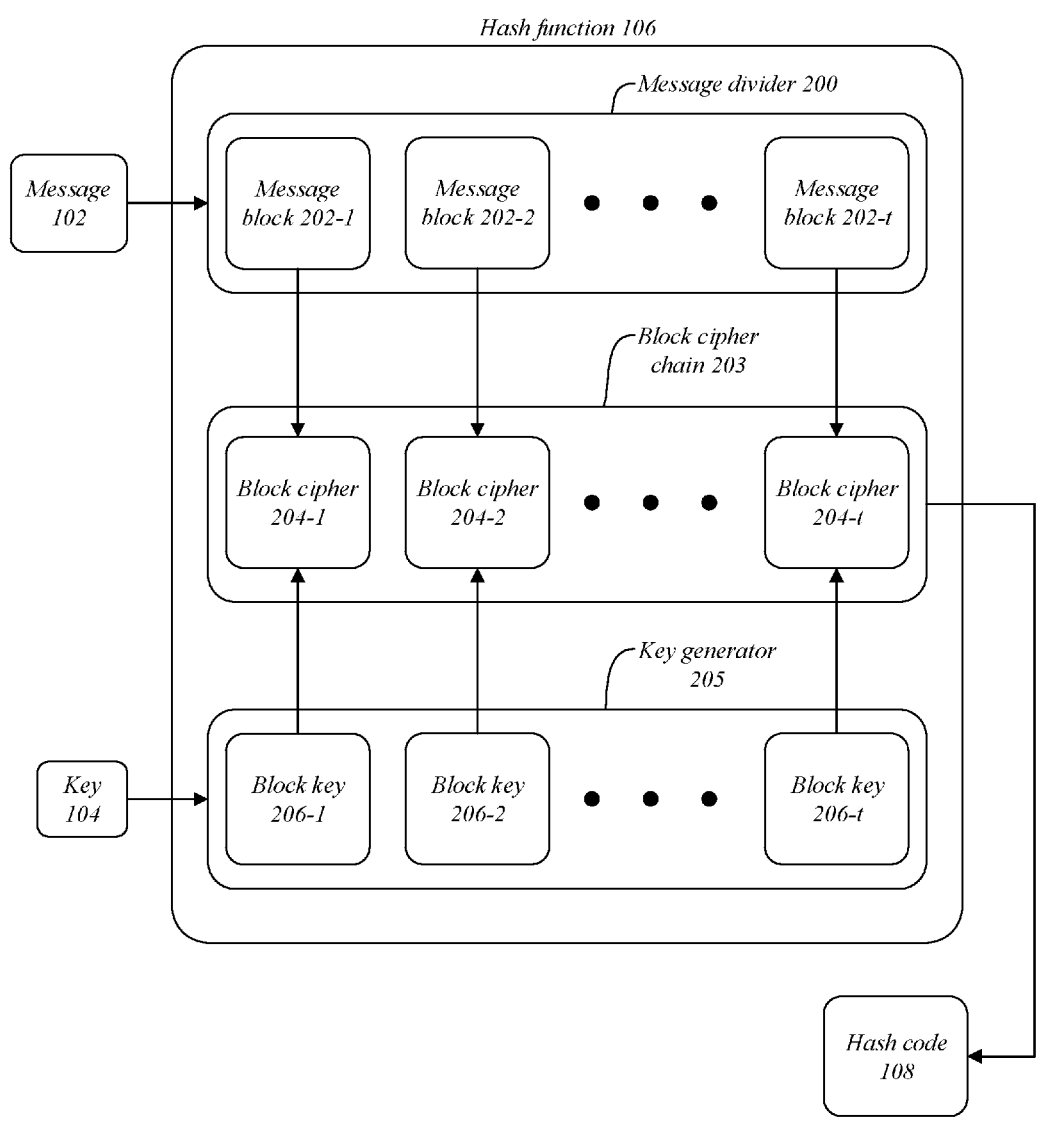
FIG. 2 illustrates an embodiment of a hash function.

FIG. 2 illustrates an embodiment of hash function 106. Hash function 106 may include message divider 200, block cipher chain 203, and key generator 205. Generally, message divider 200 may receive message 102 and divide message 102 into a plurality of message blocks 202-1, 202-2, 202-t. Key generator 205 may receive key 104 and generate a plurality of block keys 206-1, 206-2, 206-t based, in part, on key 104. In some embodiments, key 104 may serve as block key 206-1. Block cipher chain 203 may include a plurality of block ciphers 204-1, 204-2, 204-t and generate hash code 108 as output. In various embodiments each block cipher may generate ciphertext as output. In some embodiments each block cipher 204 in block cipher chain 203 may be identical. In various embodiments, block cipher chain 203 may utilize block ciphers recursively, however to simplify the description they are shown as separate. For instance, a set of one or more block ciphers may be used repeatedly to achieve the same functionality described herein. As shown in FIG. 2, each block cipher 204-1, 204-2, 202-t may receive corresponding message blocks 202-1, 202-2, 202-t and corresponding block keys 206-1, 206-2, 206-t as inputs for the generation of hash code 108. In some embodiments, the output of the last block cipher in block cipher chain 203 may be hash code 108. Embodiments are not limited in this context.

Figure 3:
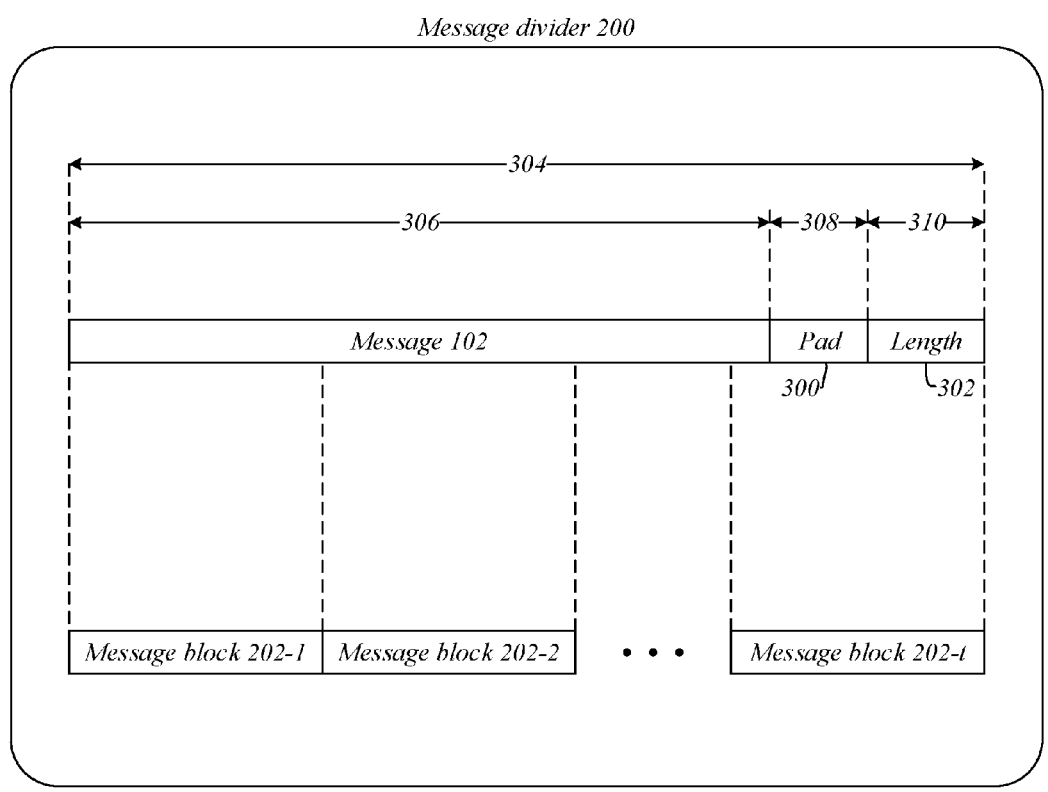
FIG. 3 illustrates an embodiment of a message divider.

FIG. 3 illustrates an embodiment of message divider 202. Message divider 202 may receive message 102. In some embodiments, message 102 is a message of variable bit length 306 with a maximum length of $2^{256}$ bits. Message divider 202 may divide message 102 into a plurality of message blocks 202-1, 202-2, 202-t. In various embodiments each message block 202 is 512-bits long. In some embodiments, message divider 200 may append a pad 300 and a length 302 to message 102. Appending pad 300 and length 302 may ensure that the padded message 304 is a multiple of 512 bits. In various embodiments, pad 300 may include a determined amount of bits 308 that ensure message block 202-t is 512-bits long. In various such embodiments, pad 300 may include a single 1-bit followed by the necessary number of 0-bits. Length 302 may include the length of message 102 in bits. In some embodiments, length 302 may be a 256-bit block 310 that is treated as an unsigned 256-bit integer. Embodiments are not limited in this context.

Figure 4:
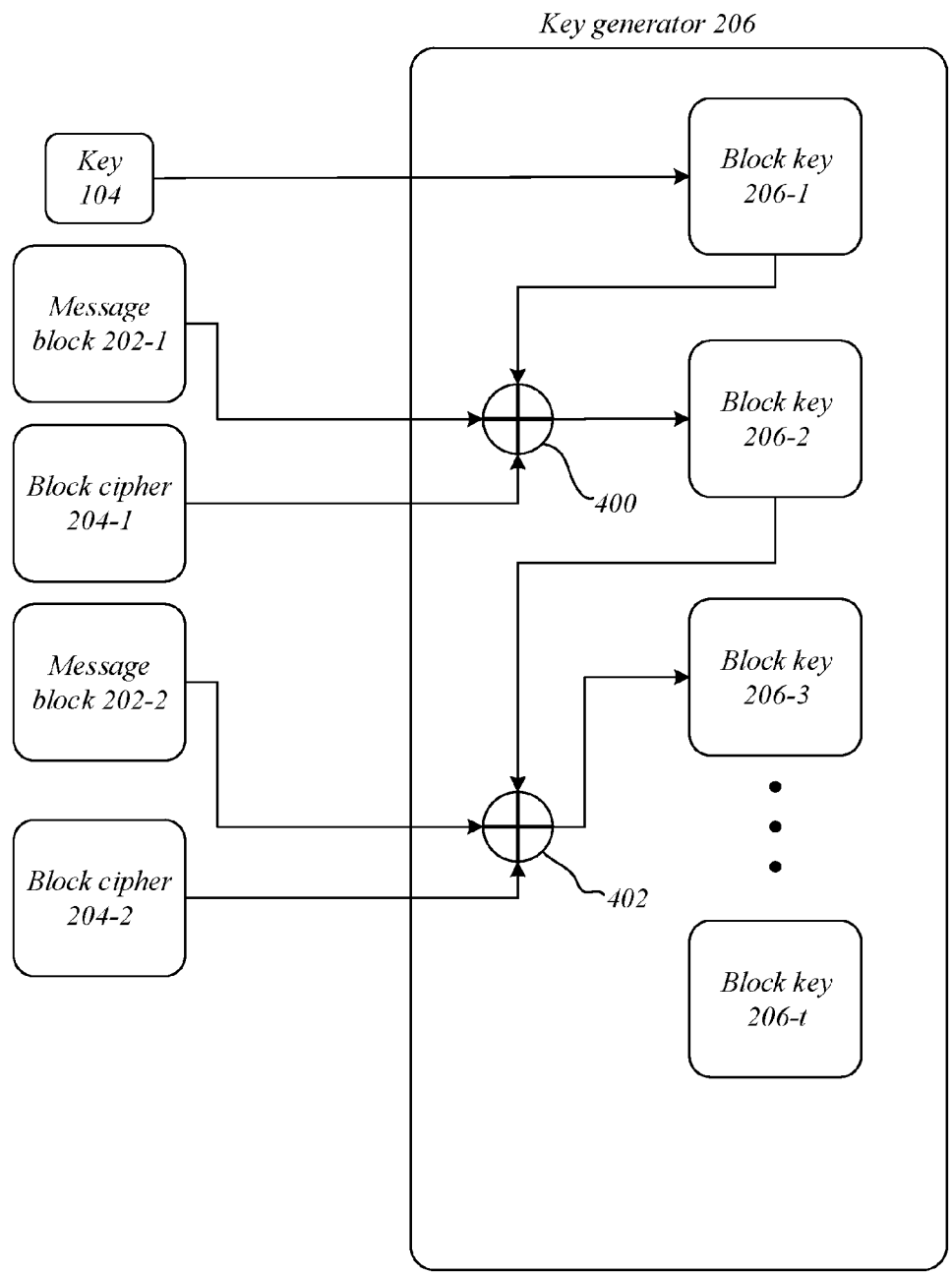
FIG. 4 illustrates an embodiment of a key generator.

FIG. 4 illustrates an embodiments of key generator 205. Key generator 205 may generate a plurality of block keys 206 and provide them as input to block cipher chain 203. In some embodiments, block key 206-1 may be key 104. In various embodiments, block key 206-1 may include the initial vector 512'h0 for the first message block and intermediate hash values may serve as the additional block keys 206-2, 206-3, 206-t. For example, block key 206-2 may be generated by exclusive or (XOR) gate 400. XOR gate 400 may receive block key 206-1, message block 202-1, and the output or ciphertext of block cipher 204-1 as inputs and produce block key 206-2, also referred to as an intermediate hash value, as output. Block key 206-3 may be generated by XOR gate 402. XOR gate 402 may receive block key 206-2, message block 202-2, and the output or ciphertext of block cipher 204-2 as inputs and produce block key 206-3, also referred to as an intermediate hash value, as output. This structure may be repeated to produce each block key through block key 206-t. In other words, the cipher text from each block cipher is XOR-ed with a respective block key and a respective message block to generate an intermediate hash value, creating a block chain of all input message blocks. The symbol used to illustrate XOR gates 400, 402 in FIG. 4 may generally be used in one or more other figures referenced herein to illustrate XOR gates. Embodiments are not limited in this context.

Figure 5:
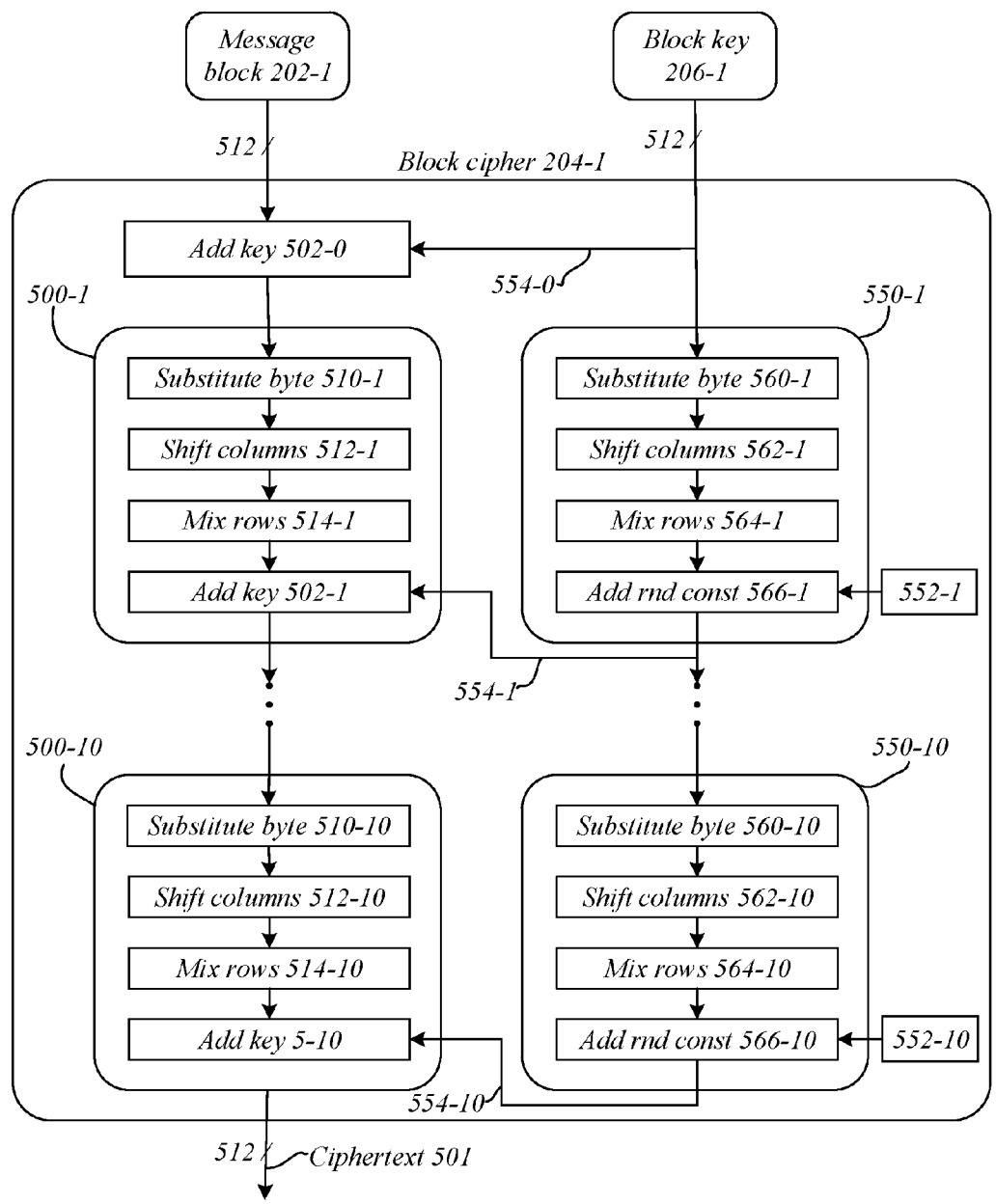
FIG. 5 illustrates an embodiment of a block cipher.

FIG. 5 illustrates an embodiment of block cipher 204-1. Block cipher 204-1 may receive message block 202-1 and block key 206-1 as 512-bit inputs and generate ciphertext 501 as a 512-bit output. In some embodiments, block cipher 204-1 includes a plurality of cipher rounds 500 and a plurality of key expansions 550. As will be appreciated, each block cipher in block cipher chain 203 may function in the same or similar manner as described with respect to block cipher 204-1. Cipher block 204-1 may primarily involve the use of four different functions or transformations: add key (AK) 502, substitute byte (SB) 510, 560, shift columns (SC) 512, 562, and mix rows (MR) 514, 564. In various embodiments, cipher block 204-1 includes a single application of AK 502-0 followed by ten rounds that involve all four functions. Key expansions 550 may use round constants 552 to expand block key 206-1 into a sequence of round keys 554. Embodiments are not limited in this context.

In various embodiments, message block 202-1 and block key 206-1 may be input into block cipher 204-1 as single 512-bit blocks that are treated as 8×8 matrices of bytes. In various such embodiments, these input matrices of bytes may be referred to as the message matrix and the key matrix respectively and may serve as input into each function or transformation of cipher block 204-1. AK 502 may perform a byte-wise XOR of each byte in the message matrix with the corresponding byte in the key matrix generated by key expansion 550. SC 512, 562 may perform a permutation operation by shifting the elements in each column of a matrix depending on the column number. For instance, given input matrix A and output matrix B, B=SC (A)⇔b=$a_{(i-j)mod\ 8,j}$ 0≤i,j≤7. In terms of hardware implementation, the AK function may be a bit-wise XOR of two 512-bit vectors and SC may be permutation of input bytes, dominated by interconnects. The functions SB 510, 560 and MR are the more area and computation intensive parts of block cipher 204-1 and will be described in more detail with respect to FIGS. 6A-8F.

Figure 6A:
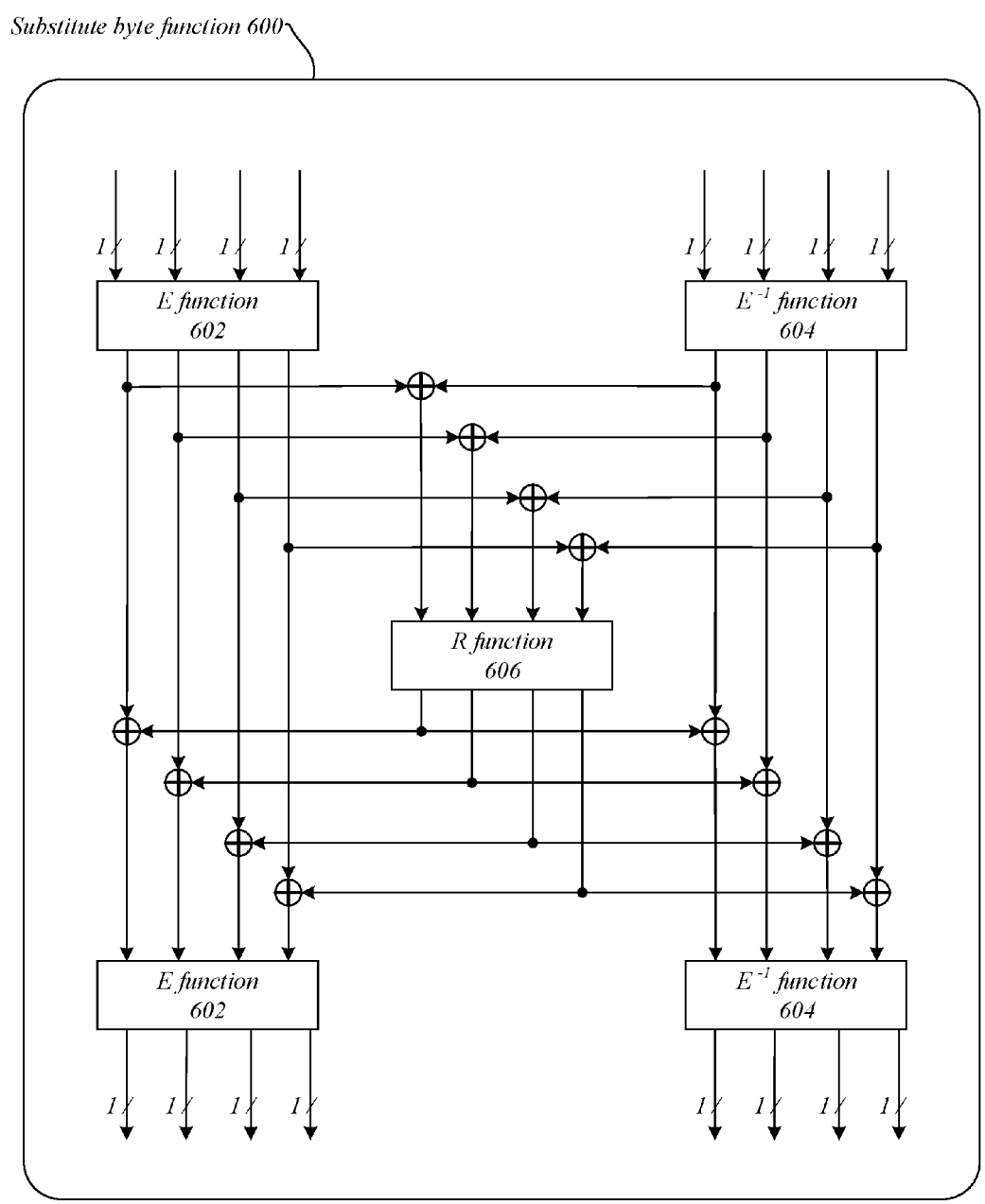
FIG. 6A illustrates an embodiment of a substitute byte function.

FIG. 6A illustrates an embodiment of a substitute byte (SB) function 600. SB function 600 may be the same or similar to substitute byte 510, 560. The SB function 600 may perform a non-linear transformation of each byte in an input matrix, such as a message matrix or a key matrix. In various embodiments, the non-linear transformation may exhibit no correlations between linear combinations of input bits and linear combinations of output bits. In some embodiments, the non-linear transformation may cause small input changes to result in large output changes. In other words, differences between sets of input bits may not propagate into similar differences among corresponding output bits. In these and other ways, the SB function 600 may make hash function 106 resistant to linear and differential cryptanalysis. Embodiments are not limited in this context.

The SB function may receive an 8-bit input which is split into two 4-bit vectors that go through three functions: an E function 602, an $E^{-1}$ function 604, and an R function 606. The E function 602 can be defined by, $E(u)=(0xB)^u$ over the finite field $GF(2^4)$ with irreducible polynomial, $f(x)=x^4+x+1$. The $E^{-1}$ function 604 may be the inverse of $E(u)$ and require the inverse logarithm with base 0xB. The R function 606 may be a pseudorandomly generated permutation function and may be specified in the specification of the Whirlpool algorithm. In various embodiments described herein, the E function 602 may be implemented in dedicated hardware or circuitry using area-optimized Galois Field arithmetic to improve performance of the E function 602.

Figure 6B:
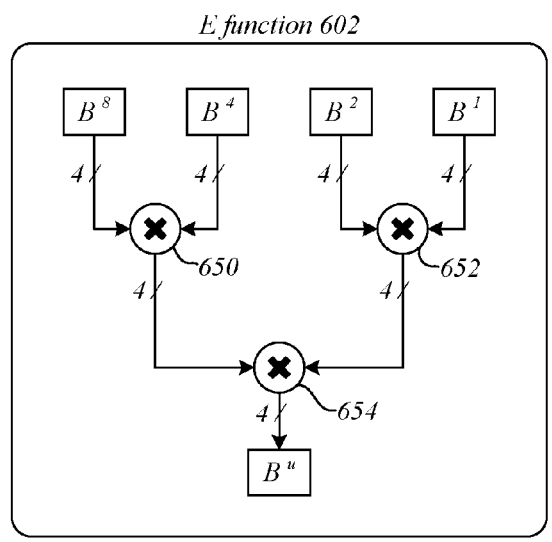
FIGS. 6B-6C illustrate embodiments of an E function of a substitute byte function.
Figure 6C:
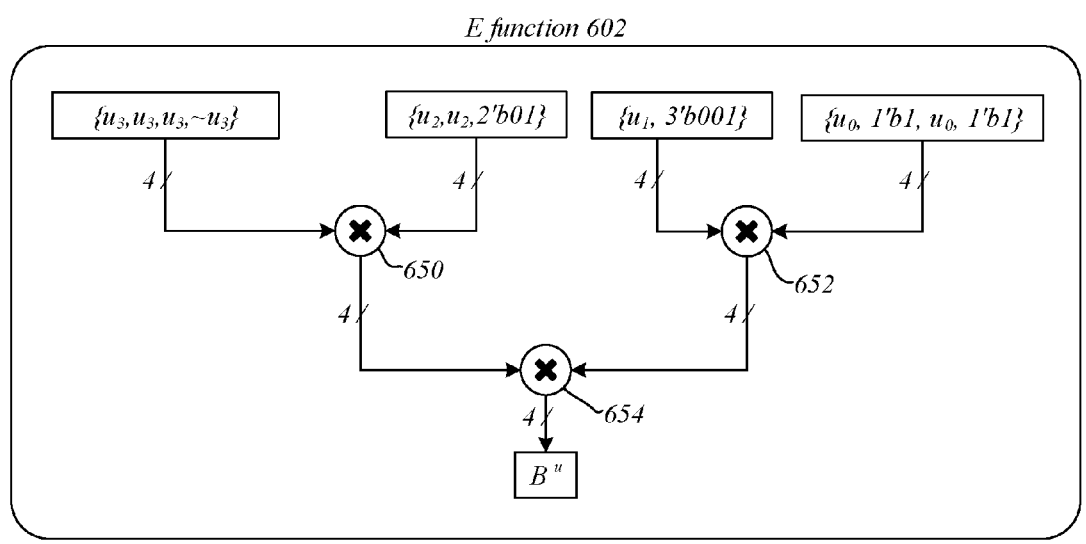

FIGS. 6B-6C illustrate embodiments of E function 602 of the substitute byte function 600. In FIGS. 6B-6C, operators 650, 652, 654 represent multiplication operations. In various embodiments, E function 602 and operators 650, 652, 654 may be implemented in dedicated hardware or circuitry to achieve a more efficient and better performing substitute byte function 600. For example, an area-optimized Galios Field arithmetic implementation for E function 602 may be achieved using dedicated hardware or circuitry. Embodiments are not limited in this context.

The E function 602 may be implemented as shown in FIG. 6B and according to the following relationships:

$$E(u)=0xB \text{ over } f(x)=x^4+x+1$$

$$E(u)=0xB^{u[3]u[2]u[1]u[0]}$$

$$E(u)=0xB^{(u[3]\times 8+u[2]\times 4+u[1]\times 2+u[0]\times 1)}$$

$$E(u)=(u[3]\times B^8+\sim u[3])\times(u[2]\times B^4+\sim u[2])\times(u[1]\times B^2+\sim u[1])\times(u[0]\times B^1+\sim u[0]), \text{ where } u[i]=\{0,1\}$$

The values of $B^8$, $B^4$, $B^2$, and $B^1$ reduced using f(x), may be precomputed as $B^8 \bmod f(x)$=4'b1110, $B^4 \bmod f(x)$=4'b1101, $B^2 \bmod f(x)$=4'b1001, and $B^1 \bmod f(x)$=4'b1011.

Accordingly, the output of operator 650 may be (u[3]× $B^8+\sim u[3])\times(u[2]\times B^4+\sim u[2])$ and adhere to the following truth table:

| Input, $u_3$ | Input, $u_2$ | Output |
|---|---|---|
| 0 | 0 | 4'b1 |
| 0 | 1 | 4'b1101 (i.e., $B^4 \bmod f(x)$) |
| 1 | 0 | 4'b1110 (i.e., $B^8 \bmod f(x)$) |
| 1 | 1 | (4'b1110 × 4'b1101)mod f(x) in Galois Field |

And the output of operator 652 may be (u[1]×$B^2+\sim u[1])\times(u[0]\times B^1+\sim u[0])$ and adhere to the following truth table:

| Input, $u_1$ | Input, $u_0$ | Output |
|---|---|---|
| 0 | 0 | 4'b1 |
| 0 | 1 | 4'b1011 (i.e., $B^1 \bmod f(x)$) |
| 1 | 0 | 4'b1001 (i.e., $B^2 \bmod f(x)$) |
| 1 | 1 | (4'b1001 × 4'b1011)mod f(x) in Galois Field |

This may optimize the implementation of the E function 602 as shown in FIG. 6C. In some embodiments, the $E^{-1}$ function 604 and the R function 606 may be implemented using LUTs. The optimized implementation of E function 602 may improve the area of the SB function when compared to an implementation of E function 602 using LUTs.

Figure 7A:
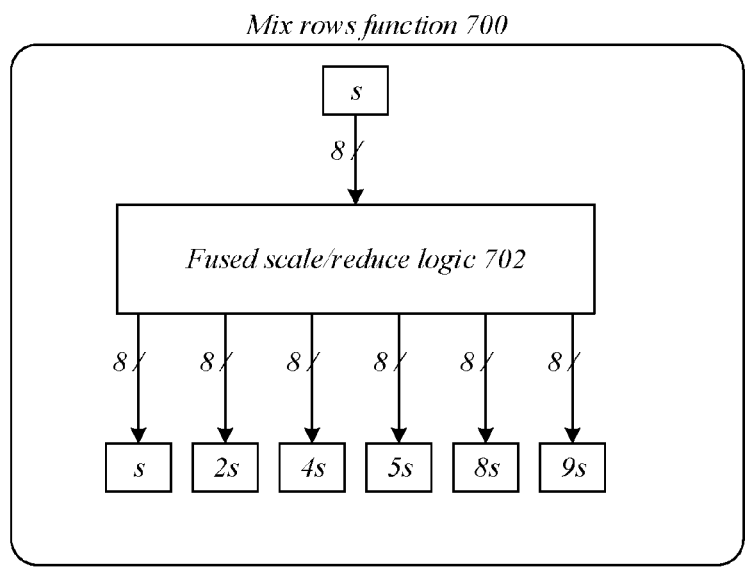
FIG. 7A illustrates an embodiment of a mix rows function.

FIG. 7A illustrates an embodiment of a mix rows (MR) function 700. MR function 700 may be the same or similar to mix rows 514, 564. The MR function 700 may perform a diffusion operation in each row of an input matrix by mapping each byte in a row to a new value that is dependent on all other bytes in the row. In various embodiments described herein, the MR function 700 may be implemented in dedicated hardware or circuitry using fused scale/reduce logic to improve performance of the MR function 700, such as by reducing the critical path. The MR function 700 may include fused scale/reduce logic 702 that is able to produce various factors of an input byte, s. In the illustrated embodiment, the fused scale/reduce logic 702 may be implemented as fused scale/reduce logic to generate the factors 2×, 4×, 5×, 8×, and 9× of the input byte s. Embodiments are not limited in this context.

In various embodiments, the MR function may generally operate as follows: given input matrix A, output matrix B, and scaling matrix C, B=MR (A)=AC. The scaling matrix, C, may be defined as:

| 01 | 01 | 04 | 01 | 08 | 05 | 02 | 09 |
| 09 | 01 | 01 | 04 | 01 | 08 | 05 | 02 |
| 02 | 09 | 01 | 01 | 04 | 01 | 08 | 05 |
| 05 | 02 | 09 | 01 | 01 | 04 | 01 | 08 |
| 08 | 05 | 02 | 09 | 01 | 01 | 04 | 01 |
| 01 | 08 | 05 | 02 | 09 | 01 | 01 | 04 |
| 04 | 01 | 08 | 05 | 02 | 09 | 01 | 01 |
| 01 | 04 | 01 | 08 | 05 | 02 | 09 | 01 |

The individual multiplications and additions of the matrix multiplications may be performed in $GF(2^8)$ with the irreducible polynomial $f(x)=x^8+x^4+x^3+x^2+1$. The matrix multiplication may be implemented as the sum of scaled factors of each element in a row of an input matrix in $GF(2^8)$.

Figure 7B:
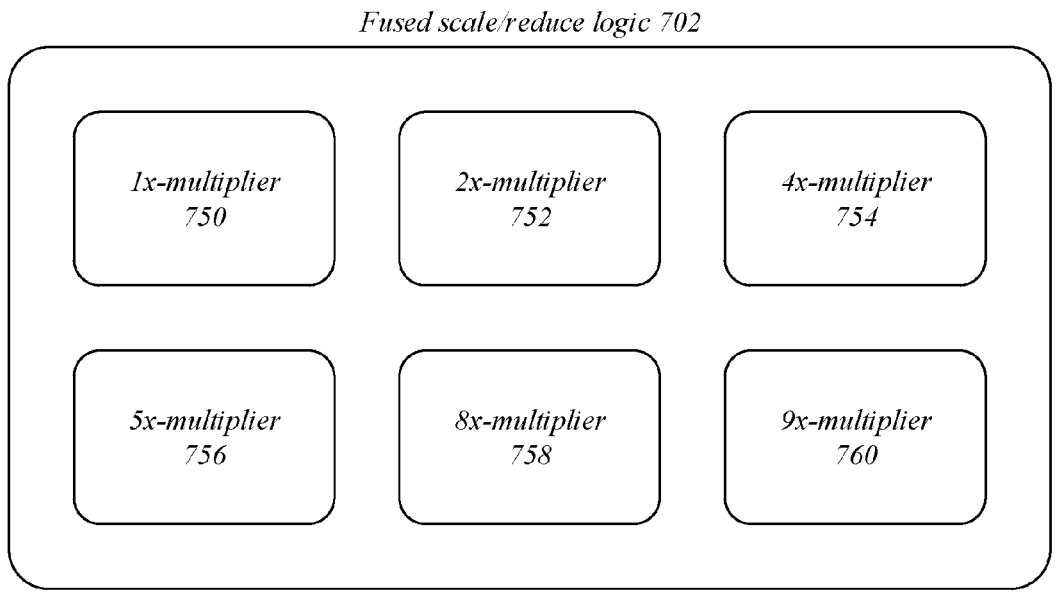
FIG. 7B illustrates an embodiment of fused scale/reduce logic of a mix rows function.
Figure 8A:
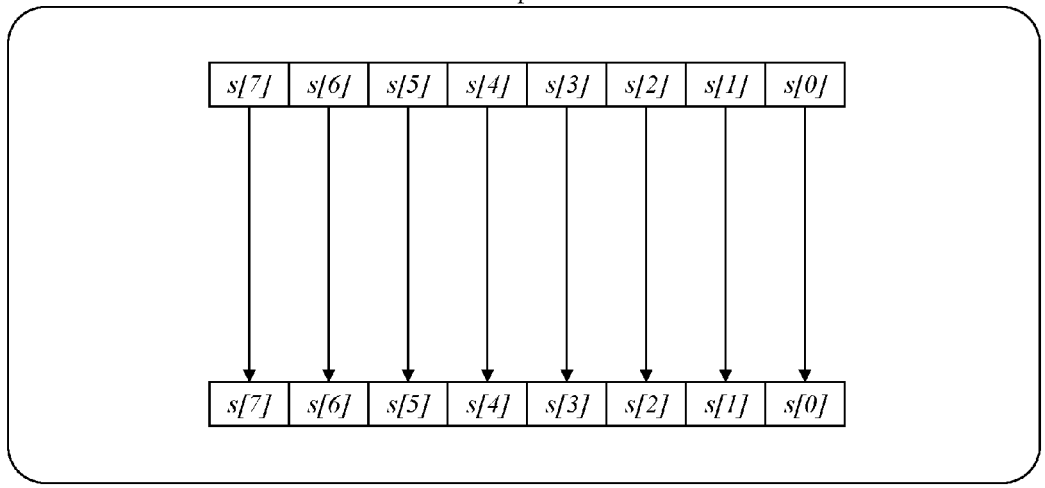
FIGS. 8A-8F illustrate embodiments of various components of fused scale/reduce logic.
Figure 8B:
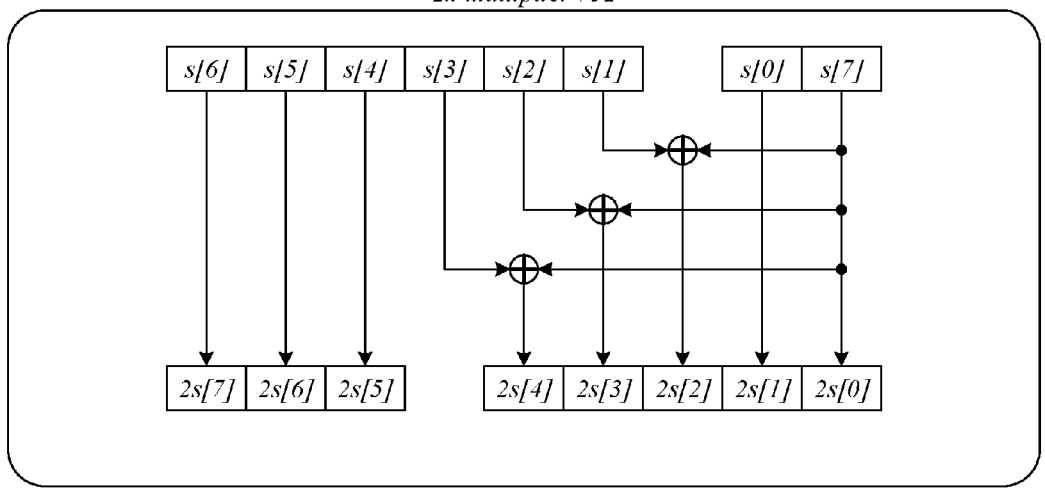
Figure 8C:
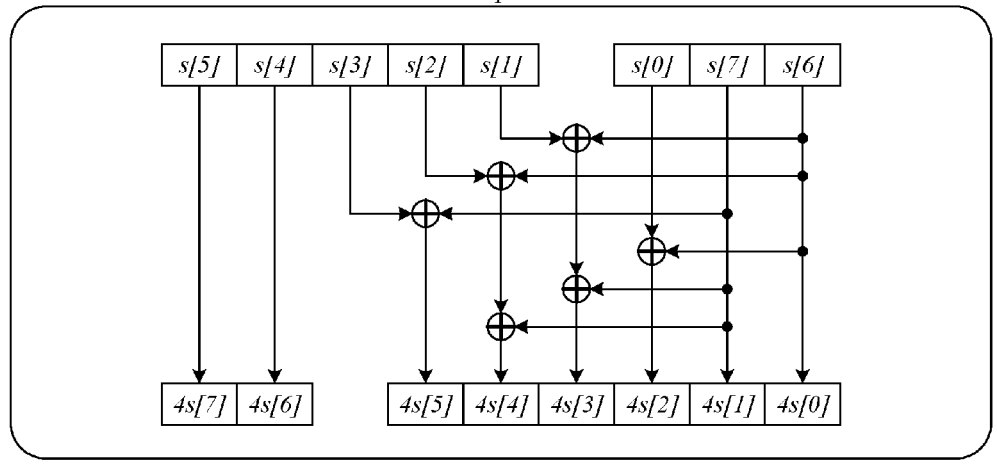
Figure 8D:
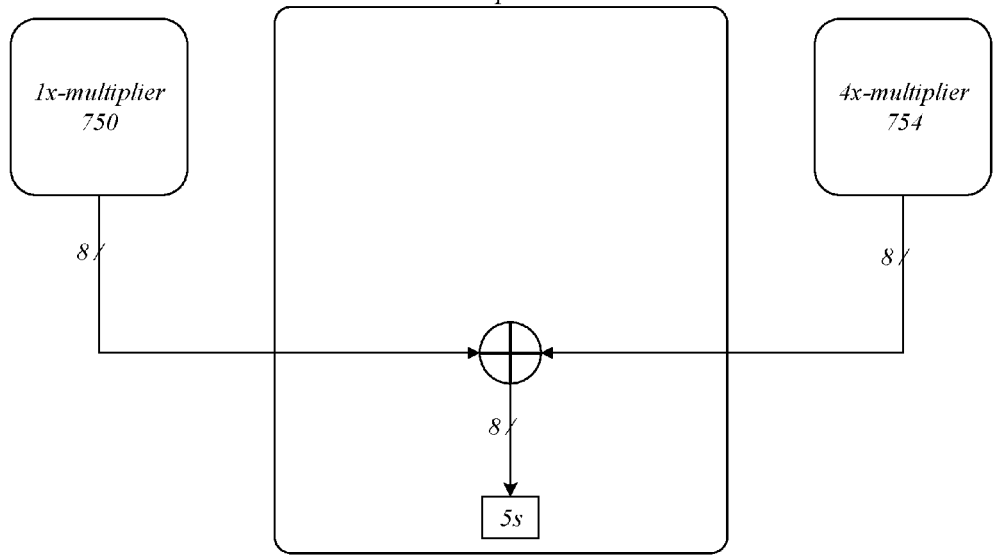
Figure 8E:
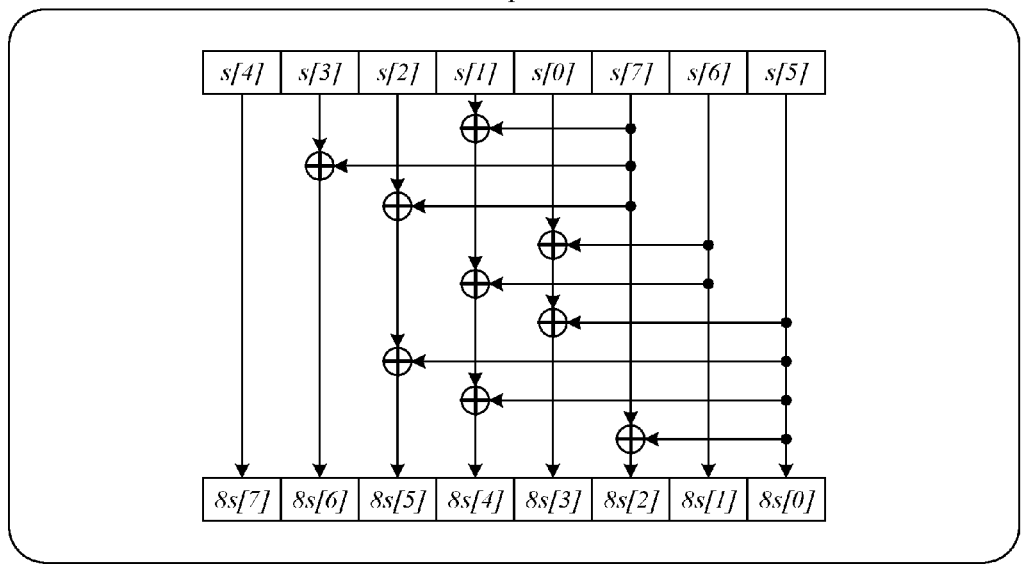
Figure 8F:
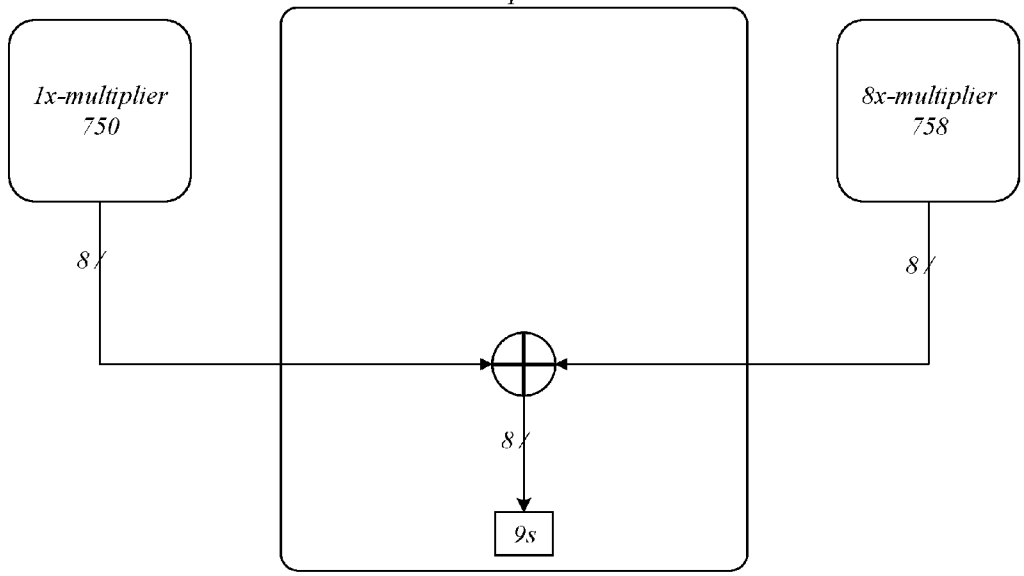

FIG. 7B illustrates an embodiment of fused scale/reduce logic 702 of mix rows function 700. Fused scale/reduce logic 702 may include 1×-multiplier 750, 2×-multiplier 752, 4×-multiplier 754, 5×-multiplier 756, 8×-multiplier 758, and 9×-multiplier 760, each scaling the input, s, by 2, 4, 5, 8, and 9 respectively. In various embodiments, the multipliers 750, 752, 754, 756, 758, 760 may be implemented using dedicated hardware or circuitry, such as fused scale/reduce logic, to optimize the implementation of the scaling to a handful of XOR gates. Embodiments are not limited in this context.

FIGS. 8A-8F illustrate implementations of each of the multipliers 750, 752, 754, 756, 758, 760 of MR function 700. In various embodiments described herein, the multipliers of MR function 700 may be implemented in dedicated hardware or circuitry using fused scale/reduce logic, as illustrated in FIGS. 8A-8F, to improve performance of the MR function 700. In the illustrated embodiments, the 2×-multiplier 752, 4×-multiplier 754, and 8×-multiplier 758 can be determined by shifting left s[7:0] by 1, 2, and 3 places and reducing using the reduction polynomial, $f(x)=x^8+x^4+x^3+x^2+1$. The 5×-multiplier 756 and 9×-multiplier 760 can be determined by XOR-ing (addition in $GF(2^8)$)s, 4s, and s, 8s respectively. Embodiments are not limited in this context.

Figure 9:
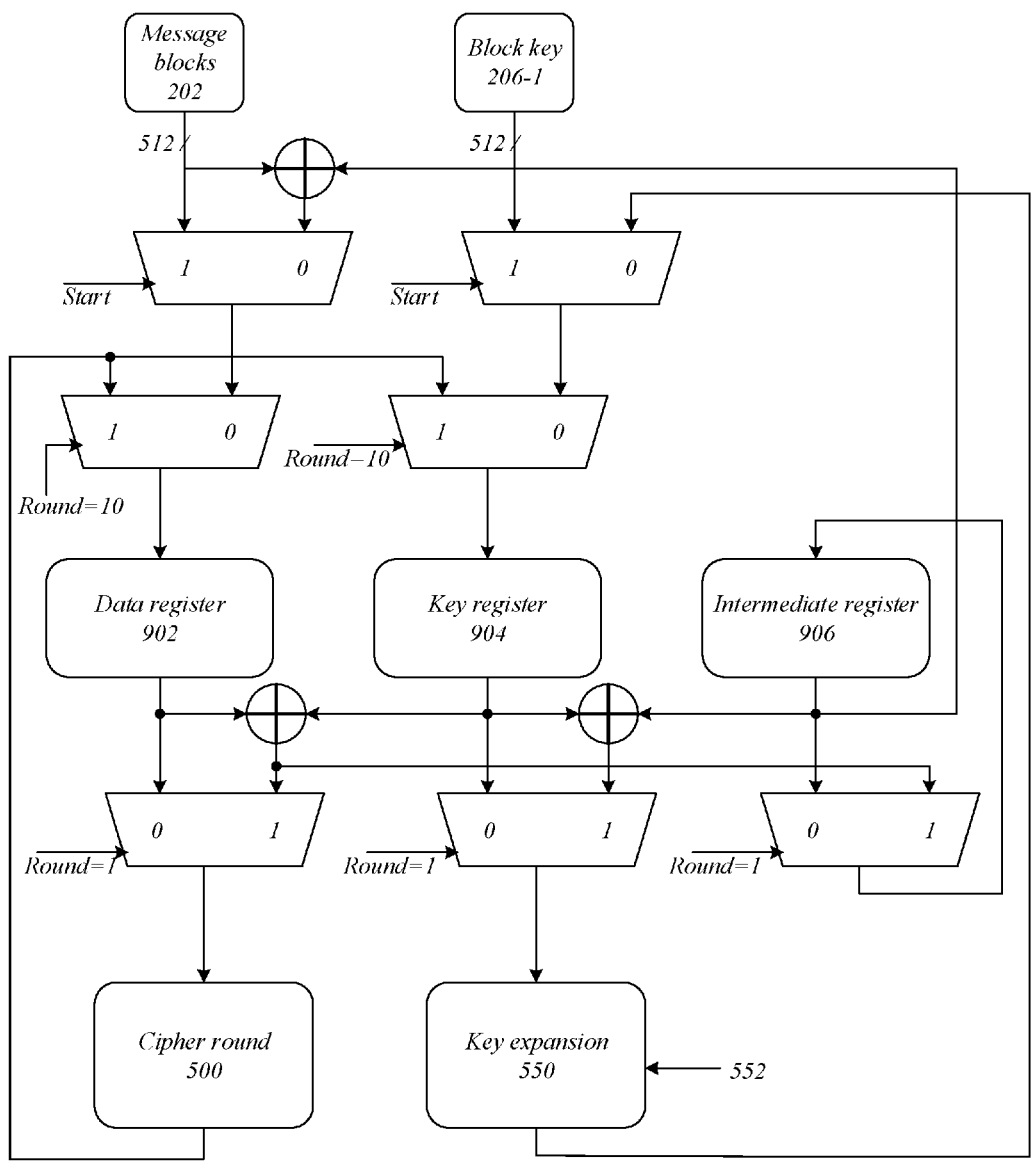
FIG. 9 illustrates an embodiment of a microarchitecture of a secure authentication system.

FIG. 9 illustrates an embodiment of a microarchitecture of secure authentication system 100. The microarchitecture may include data register 902, key register 904, and intermediate register 906. These three register banks may store working data, working key, and the XOR of the input message block and key respectively. In some embodiments the registers 902, 904, 906 are 512-bit registers. In various embodiments, this microarchitecture may reduce the sequential logic area and clock power of secure authentication system 100. Embodiments are not limited in this context.

At the start of the hashing operation, the first message block of message blocks 202 is loaded into data register 902 and block key 206-1 is loaded into key register 904. In various embodiments, block key 206-1 may include an initial vector of 512'h0. In round 1 of the block cipher, the XOR of the first message block and block key 206-1 may be stored in intermediate register 906. During the subsequent 9 rounds of encryption, the output of the cipher round 500 and key expansion 550 may be stored in the data register 902 and the key register 904 respectively. At the end of the $10^{th}$ round, the output of the cipher round 500 may be stored in the key register 904 and the XOR of the intermediate register 906 and the next message block of message blocks 202 may be stored in data register 902. During round 1, the XOR of data register 902 and key register 904 may generate the new plaintext for the cipher block to complete the addition of the previous message+key and the AK function of the current cipher round 500. Similarly, key register 904 may be XOR-ed with the intermediate register to complete the XOR of the previous cipher text with the previous message+key to generate the new valid round key. Also, the intermediate register may be updated with the current message+key. In various embodiments, the disclosed multiplexed data flow can limit the storage requirement to only three 512-bit register blocks by delaying the completion of each encrypt operation. In various such embodiments, the latency of encrypt operations and hence the hashing of each 512-bit block of the input message can be maintained at 10-cycles.

Figure 10:
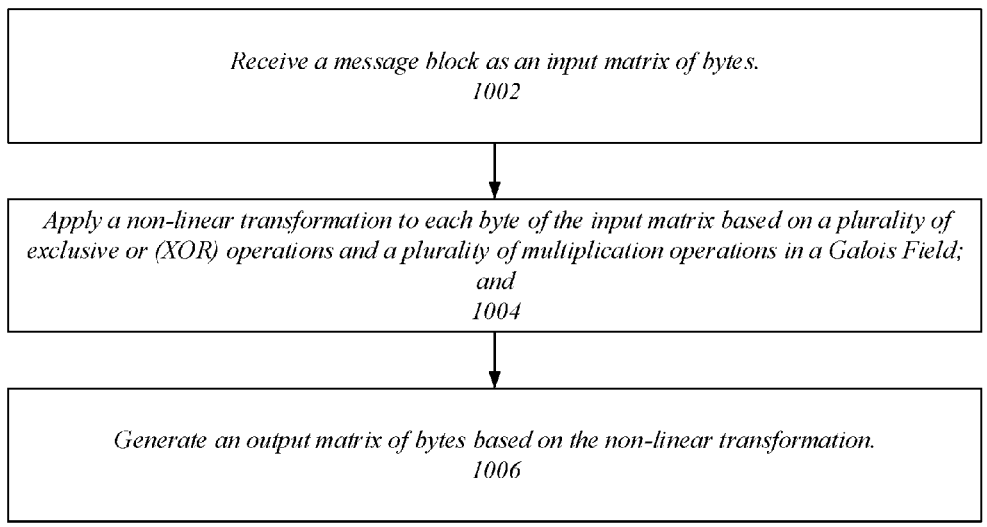
FIG. 10 illustrates an embodiment of a first logic flow.

FIG. 10 illustrates one embodiment of a logic flow 1000. The logic flow 1000 may be representative of some or all of the operations executed by one or more embodiments described herein. Embodiments are not limited in this context.

In the illustrated embodiment shown in FIG. 10, the logic flow 1000 may begin at block 1002. At block 1002 "receive a message block as an input matrix of bytes" a message block may be received as an input matrix of bytes. For example, block cipher 204-1 may receive message block 202-1 as an input matrix of bytes. In various embodiments, the input matrix of bytes may be provided to block cipher 204-1 by message divider 200.

Continuing to block 1004 "apply a non-linear transformation to each byte of the input matrix based on a plurality of multiplication operations in a Galois Field" each byte of the input matrix may be non-linearly transformed by applying a plurality of multiplication operations in a Galois Field. For example, the E function 602 of the substitute byte function 600 may apply a plurality of multiplication operations in a Galois Field to non-linearly transform the input matrix. In various embodiments, substitute byte function 600 may split each byte into two four-bit vectors and provide at least one bit from each of the four-bit vectors as inputs to operator 650.

At block 1006 "generate an output matrix of bytes based on the non-linear transformation" an output matrix of bytes may be generated based on the non-linear transformation. For example, substitute byte 510-1 may provide the output matrix of bytes to shift columns 512-1 as input. In various embodiments, the substitute byte function 600 may include a portion of cipher rounds 500 or key expansions 550.

FIG. 11 illustrates one embodiment of a logic flow 1100. The logic flow 1100 may be representative of some or all of the operations executed by one or more embodiments described herein. Embodiments are not limited in this context.

In the illustrated embodiment shown in FIG. 11, the logic flow 1100 may begin at block 1102. At block 1102 "receive a message block, the message block comprising a matrix of bytes" a message block may be received as an input matrix of bytes. For example, block cipher 204-1 may receive message block 202-1 as an input matrix of bytes. In various embodiments, the input matrix of bytes may be provided to block cipher 204-1 by message divider 200.

Continuing to block 1104 "map, through fused scale/reduce logic, each byte in a row of the input matrix of bytes to a new value, the new value based on each of the other bytes in the row" each byte in a row of the input matrix of bytes may be mapped, through fused scale/reduce logic, to a new value that is based on each of the other bytes in the row. For example, fused scale/reduce logic 702 of mix row function 700 may use fused scale/reduce logic to determine factors of an input byte, s. In various embodiments, in various embodiments, mix rows function 700 may map each byte in a row of the input matrix of bytes to a new value with fused scale/reduce logic 702 that utilizes a plurality of exclusive or (XOR) gates, such as those illustrated in FIGS. 8A-8F.

At block 1106 "generate an output matrix of bytes based on mapping" an output matrix of bytes may be generated based on the mapping. For example, mix rows 514-1 may provide the output matrix of bytes to add key 502-1 as input. In various embodiments, the mix rows function 700 may include a portion of cipher rounds 500 or key expansions 550.

FIG. 12 illustrates an embodiment of a storage medium 1200. Storage medium 1200 may comprise any non-transitory computer-readable storage medium or machine-readable storage medium, such as an optical, magnetic or semiconductor storage medium. In various embodiments, storage medium 1200 may comprise an article of manufacture. In some embodiments, storage medium 1200 may store computer-executable instructions, such as computer-executable instructions to implement one or more of logic flows or operations described herein, such as with respect to 1000 and 1100 of FIGS. 10-11. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 13:
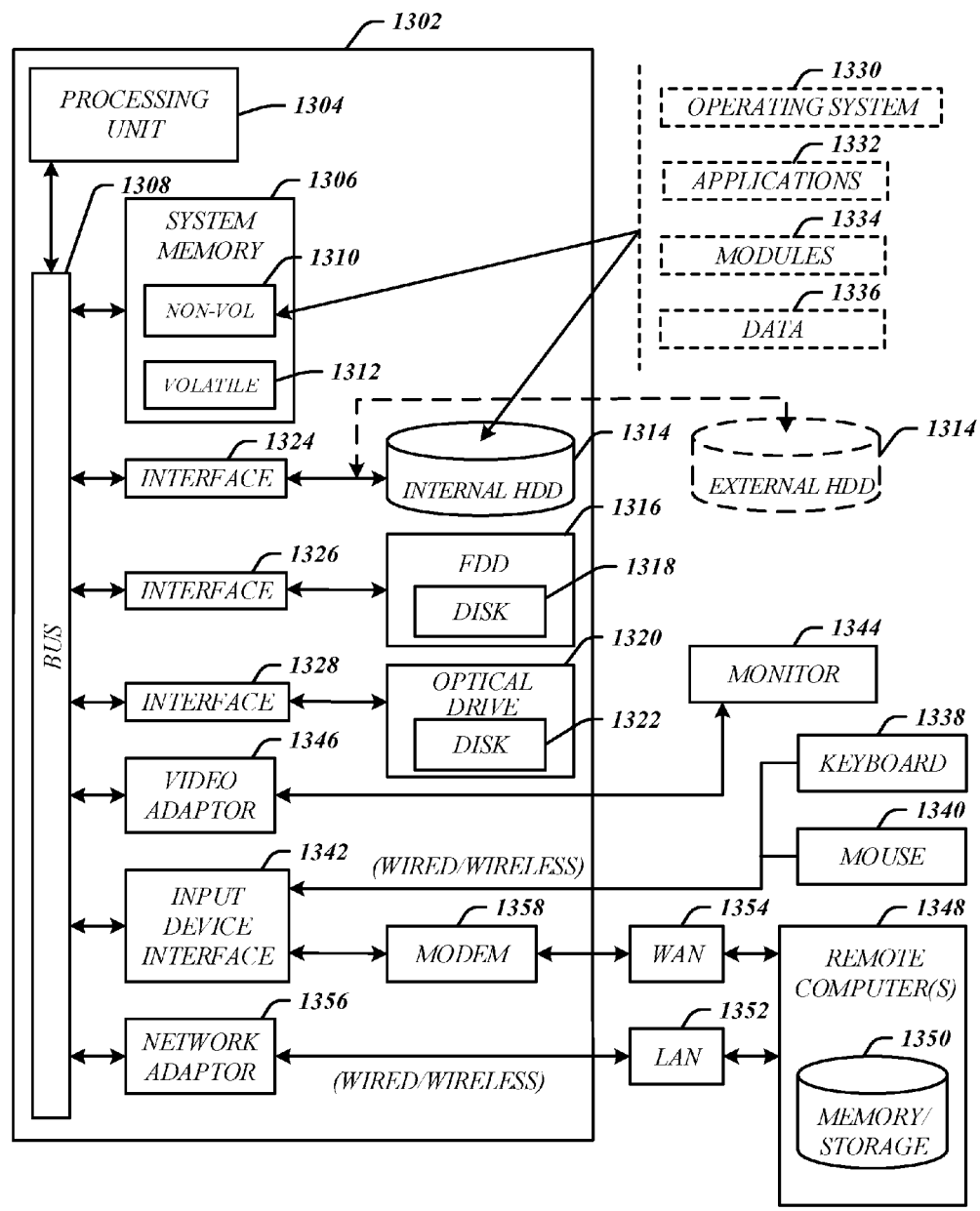
FIG. 13 illustrates an embodiment of a computing architecture.

FIG. 13 illustrates an embodiment of an exemplary computing architecture 1300 that may be suitable for implementing various embodiments as previously described. In various embodiments, the computing architecture 1300 may comprise or be implemented as part of an electronic device. In some embodiments, the computing architecture 1300 may be representative, for example, of a processor server that implements one or more components of the computer-mediated reality system 100. In some embodiments, computing architecture 1300 may be representative, for example, one or more portions of hash function 106 that implement one or more components of secure authentication system 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the secure authentication system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 994 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
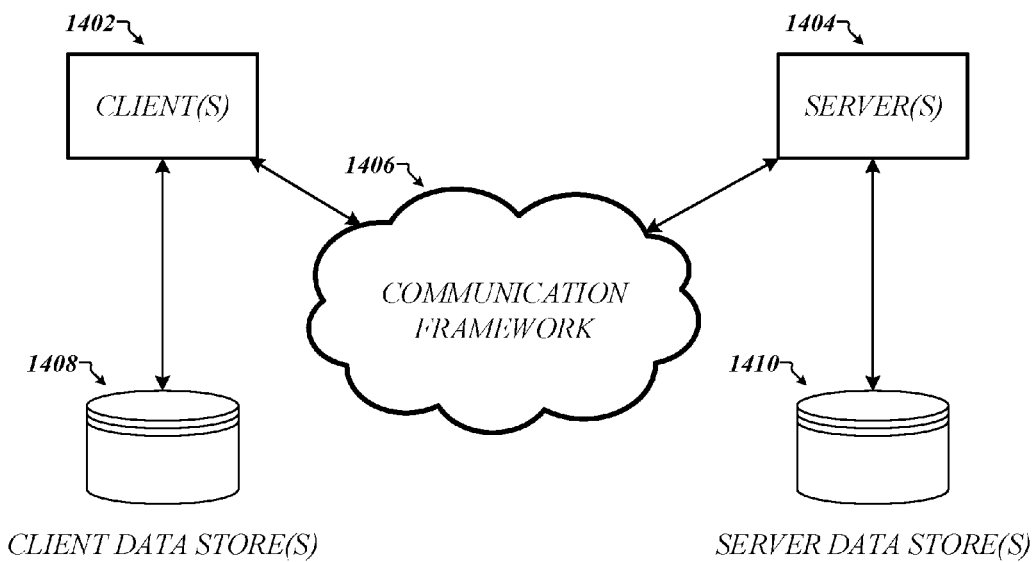
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 and the servers 1404 are operatively connected to one or more respective client data stores 1408 and server data stores 1410 that can be employed to store information local to the respective clients 1402 and servers 1404, such as cookies and/or associated contextual information. In various embodiments, any one of servers 1404 may implement one or more of logic flows or operations described herein, and storage medium 1200 of FIG. 12 in conjunction with storage of data received from any one of clients 1402 on any of server data stores 1410.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus to generate a hash for secure authentication, comprising: a memory; and logic comprised in circuitry coupled to the memory, the logic to: receive a message block as an input matrix of bytes; apply a non-linear transformation to each byte of the input matrix based on a plurality of multiplication operations in a Galois Field; and generate an output matrix of bytes based on the non-linear transformation.

Example 2 includes the subject matter of Example 1, the logic comprising a plurality of multiplication operators to implement the plurality of multiplication operations in the Galois field, the plurality of multiplication operators implemented in dedicated hardware or circuitry.

Example 3 includes the subject matter of Example 2, the logic to split each byte into two four-bit vectors and provide at least one bit from each of the four-bit vectors as inputs to a first multiplication operator of the plurality of multiplication operators.

Example 4 includes the subject matter of Example 3, the logic comprising input of a second multiplication operator of the plurality of multiplication operators coupled to the output of the first multiplication operator.

Example 5 includes the subject matter of Example 4, the output matrix to include output of the second multiplication operator.

Example 6 includes the subject matter of Example 1, the message block to include 512-bits.

Example 7 includes the subject matter of Example 1, the input matrix to include an 8×8 matrix of bytes.

Example 8 includes the subject matter of Example 1, the non-linear transformation to include a non-linear substitution.

Example 9 includes the subject matter of Example 1, the non-linear transformation to include a portion of a cryptographic hash function.

Example 10 includes the subject matter of Example 9, the cryptographic hash function to include a Whirlpool hash operation.

Example 11 includes the subject matter of Example 1, the memory to include a data register, a key register, and an intermediate register.

Example 12 is a method to generate a hash for secure authentication, comprising: receiving a message block as an input matrix of bytes; applying a non-linear transformation to each byte of the input matrix based on a plurality of multiplication operations; and generating an output matrix of bytes based on the non-linear transformation.

Example 13 includes the subject matter of Example 12, comprising a plurality of multiplication operators to implement the plurality of multiplication operations in the Galois Field, the plurality of multiplication operators implemented in dedicated hardware or circuitry.

Example 14 includes the subject matter of Example 13, comprising splitting each byte into two four-bit vectors and providing at least one bit from each of the four-bit vectors an inputs to a first multiplication operator of the plurality of multiplication operators.

Example 15 includes the subject matter of Example 14, comprising an input of a second multiplication operator of the plurality of multiplication operators coupled to the output of the first multiplication operator.

Example 16 includes the subject matter of Example 15, the output matrix including output of the second multiplication operator.

Example 17 includes the subject matter of Example 12, the message block comprising 512-bits.

Example 18 includes the subject matter of Example 12, the input matrix comprising an 8×8 matrix of bytes.

Example 19 includes the subject matter of Example 12, the non-linear transformation including a non-linear substitution.

Example 20 includes the subject matter of Example 12, the non-linear transformation including a portion of a cryptographic hash function.

Example 21 includes the subject matter of Example 20, the cryptographic hash function including a Whirlpool hash operation.

Example 22 is an apparatus for secure authentication, comprising: a memory; and logic comprised in circuitry coupled to the memory, the logic to: receive a message block, the message block comprising an input matrix of bytes; map, through fused scale/reduce logic, each byte in a row of the input matrix of bytes to a new value, the new value based on each of the other bytes in the row; and generate an output matrix of bytes based on the mapping.

Example 23 includes the subject matter of Example 22, the fused scale/reduce logic to utilize a plurality of exclusive or (XOR) gates.

Example 24 includes the subject matter of Example 22, the new value based on multiplication of the input matrix with a scaling matrix.

Example 25 includes the subject matter of Example 24, multiplication of the input matrix with the scaling matrix to utilize Galois-Field arithmetic.

Example 26 includes the subject matter of Example 24, multiplication of the input matrix with the scaling matrix implemented as a sum of scaled factors of each byte in the row of the matrix of bytes.

Example 27 includes the subject matter of Example 24, multiplication of the input matrix with a scaling matrix to utilize a plurality of exclusive or (XOR) gates.

Example 28 includes the subject matter of Example 22, the message block comprising 512-bits.

Example 29 includes the subject matter of Example 22, the mapping to utilize Galois-Field arithmetic.

Example 30 includes the subject matter of Example 22, the mapping to include a portion of a cryptographic hash function.

Example 31 includes the subject matter of Example 30, the cryptographic hash function to include a Whirlpool hash operation.

Example 32 includes the subject matter of Example 22, the memory to include a data register, a key register, and an intermediate register.

Example 33 is a method to generate a hash for secure authentication, comprising: receiving a message block, the message block comprising an input matrix of bytes; mapping, through fused scale/reduce logic, each byte in a row of the input matrix of bytes to a new value, the new value based on each of the other bytes in the row; and generating an output matrix of bytes based on the mapping.

Example 34 includes the subject matter of Example 33, the fused scale/reduce logic utilizing a plurality of exclusive or (XOR) gates.

Example 35 includes the subject matter of Example 33, the new value based on multiplying the input matrix with a scaling matrix.

Example 36 includes the subject matter of Example 35, multiplying the input matrix with the scaling matrix utilizing Galois-Field arithmetic.

Example 37 includes the subject matter of Example 35, multiplying the input matrix with the scaling matrix implemented as a sum of scaled factors of each byte in the row of the matrix of bytes.

Example 38 includes the subject matter of Example 35, multiplying the input matrix with a scaling matrix utilizing a plurality of exclusive or (XOR) gates.

Example 39 includes the subject matter of Example 33, the message block comprising 512-bits.

Example 40 includes the subject matter of Example 33, the mapping utilizing Galois-Field arithmetic.

Example 41 includes the subject matter of Example 33, the mapping including a portion of a cryptographic hash function.

Example 42 includes the subject matter of Example 41, the cryptographic hash function comprising a Whirlpool hash operation.

Example 43 is an apparatus to generate a hash for secure authentication, comprising: means for receiving a message block as an input matrix of bytes; means for applying a non-linear transformation to each byte of the input matrix based on a plurality of multiplication operations in a Galois Field; and means for generating an output matrix of bytes based on the non-linear transformation.

Example 44 includes the subject matter of Example 43, comprising a plurality of multiplication operators to implement the plurality of multiplication operations in the Galois Field, the plurality of multiplication operators implemented in dedicated hardware or circuitry.

Example 45 includes the subject matter of Example 44, comprising means for splitting each byte into two four-bit vectors and providing at least one bit from each of the four-bit vectors an inputs to a first multiplication operator of the plurality of multiplication operators.

Example 46 includes the subject matter of Example 45, comprising an input of a second multiplication operator of the plurality of multiplication operators coupled to the output of the first multiplication operator.

Example 47 includes the subject matter of Example 46, the output matrix including output of the second multiplication operator.

Example 48 includes the subject matter of Example 43, the message block comprising 512-bits.

Example 49 includes the subject matter of Example 43, the input matrix to include an 8×8 matrix of bytes.

Example 50 includes the subject matter of Example 43, the non-linear transformation including a non-linear substitution.

Example 51 includes the subject matter of Example 43, the non-linear transformation including a portion of a cryptographic hash function.

Example 52 includes the subject matter of Example 51, the cryptographic hash function including a Whirlpool hash operation.

Example 53 is an apparatus to generate a hash for secure authentication, comprising: means for receiving a message block, the message block comprising an input matrix of bytes; means for mapping, through fused scale/reduce logic, each byte in a row of the input matrix of bytes to a new value, the new value based on each of the other bytes in the row; and means for generating an output matrix of bytes based on the mapping.

Example 54 includes the subject matter of Example 53, the fused scale/reduce logic utilizing a plurality of exclusive or (XOR) gates.

Example 55 includes the subject matter of Example 53, the new value based on multiplying the input matrix with a scaling matrix.

Example 56 includes the subject matter of Example 55, comprising means for multiplying the input matrix with the scaling matrix utilizing Galois-Field arithmetic.

Example 57 includes the subject matter of Example 55, comprising means for multiplying the input matrix with the scaling matrix implemented as a sum of scaled factors of each byte in the row of the matrix of bytes.

Example 58 includes the subject matter of Example 55, comprising means for multiplying the input matrix with a scaling matrix utilizing a plurality of exclusive or (XOR) gates.

Example 59 includes the subject matter of Example 53, the message block comprising 512-bits.

Example 60 includes the subject matter of Example 53, the mapping comprising means for utilizing Galois-Field arithmetic.

Example 61 includes the subject matter of Example 53, the mapping including a portion of a cryptographic hash function.

Example 62 includes the subject matter of Example 61, the cryptographic hash function comprising a Whirlpool hash operation.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
    fused scale/reduce logic including first dedicated circuitry for a first multiplier value and second dedicated circuitry for a second multiplier value;
    a hardware element comprising a processor; and
    memory comprising instructions that when executed by the processor cause the processor to:
        receive, by a block cipher function, a message block as an input matrix of bytes for secure authentication via the block cipher function that utilizes the first and second dedicated circuitry;
        apply a non-linear transformation to each byte of the input matrix based on a plurality of multiplication operations in a Galois Field, wherein a first multiplication operation of the plurality of multiplication operations in the Galois Field is performed by the first dedicated circuitry and a second multiplication operation of the plurality of multiplication operations in the Galois Field is performed by the second dedicated circuitry; and
        generate an output matrix of bytes based on the non-linear transformation for the secure authentication via the block cipher function that utilizes the first and second dedicated circuitry.

2. The apparatus of claim 1, the memory comprising instructions that when executed by the processor cause the processor to split each byte into two four-bit vectors and provide at least one bit from each of the four-bit vectors as inputs to the first dedicated circuitry of the fused scale/reduce logic.

3. The apparatus of claim 1, comprising input of the second dedicated circuitry coupled to output of the first dedicated circuitry for the first multiplier value.

4. The apparatus of claim 3, the output matrix to include output of the second dedicated circuitry for the second multiplier value.

5. The apparatus of claim 1, the message block to include 512-bits.

6. The apparatus of claim 1, the input matrix to include an 8×8 matrix of bytes.

7. The apparatus of claim 1, the non-linear transformation to include a non-linear substitution.

8. The apparatus of claim 1, the non-linear transformation to include a portion of a cryptographic hash function.

9. The apparatus of claim 8, the cryptographic hash function to include a Whirlpool hash operation.

10. A method, comprising:
    receiving, by a block cipher function, a message block, the message block comprising an input matrix of bytes for secure authentication via the block cipher function that utilizes first and second dedicated circuitry;
    mapping, through fused scale/reduce logic, each byte in a row of the input matrix of bytes to a new value, the new value based on each of the other bytes in the row, the fused scale/reduce logic including the first dedicated circuitry for a first multiplication operation and the second dedicated circuitry for a second multiplication operation, wherein mapping each byte in the row of the input matrix of bytes to the new value includes mapping through the first dedicated circuitry and the second dedicated circuitry of the fused scale/reduce logic; and
    generating an output matrix of bytes based on the mapping for the secure authentication via the block cipher function that utilizes the first and second dedicated circuitry.

11. The method of claim 10, the fused scale/reduce logic utilizing a plurality of exclusive or (XOR) gates.

12. The method of claim 10, the new value based on multiplying the input matrix with a scaling matrix.

13. The method of claim 12, multiplying the input matrix with the scaling matrix utilizing Galois-Field arithmetic.

14. The method of claim 12, multiplying the input matrix with the scaling matrix implemented as a sum of scaled factors of each byte in the row of the input matrix of bytes.

15. The method of claim 12, multiplying the input matrix with the scaling matrix utilizing a plurality of exclusive or (XOR) gates.

16. The method of claim 10, the message block comprising 512-bits.

17. The method of claim 10, the mapping utilizing Galois-Field arithmetic.

18. The method of claim 10, the mapping including a portion of a cryptographic hash function.

19. The method of claim 18, the cryptographic hash function comprising a Whirlpool hash operation.

* * * * *